(12) United States Patent
McMullen et al.

(10) Patent No.: US 7,219,067 B1
(45) Date of Patent: May 15, 2007

(54) TOTAL TRANSPORTATION MANAGEMENT SYSTEM

(75) Inventors: Greerson G. McMullen, Keswick, VA (US); Scott R. Hayden, Melbourne, FL (US)

(73) Assignee: GE Harris Railway Electronics LLC, Melbourne, FL (US)

( * ) Notice: Subject to any disclaimer, the term of this patent is extended or adjusted under 35 U.S.C. 154(b) by 447 days.

(21) Appl. No.: 09/658,370

(22) Filed: Sep. 8, 2000

Related U.S. Application Data

(60) Provisional application No. 60/153,178, filed on Sep. 10, 1999.

(51) Int. Cl.
*G06F 9/44* (2006.01)

(52) U.S. Cl. .............................. 705/7; 701/19; 701/29; 246/122 R

(58) Field of Classification Search ................... 705/7; 701/19, 20
See application file for complete search history.

(56) References Cited

U.S. PATENT DOCUMENTS

| | | | |
|---|---|---|---|
| 3,961,688 A | 6/1976 | Maynard | |
| 4,234,926 A | 11/1980 | Wallace et al. | |
| 4,630,216 A | 12/1986 | Tyler et al. | |
| 4,713,661 A | 12/1987 | Boone et al. | |
| 4,776,730 A | 10/1988 | Nearen et al. | |
| 5,281,073 A | 1/1994 | Gesuale | |
| 5,347,274 A | 9/1994 | Hassett | |
| 5,448,604 A | 9/1995 | Peterson, II | |
| 5,452,870 A | 9/1995 | Heggestad | |
| 5,533,695 A | 7/1996 | Heggestad et al. | |
| 5,623,413 A * | 4/1997 | Matheson et al. | .......... 701/117 |
| 5,625,559 A | 4/1997 | Egawa | |
| 5,794,172 A | 8/1998 | Matheson et al. | |
| 5,836,529 A * | 11/1998 | Gibbs | ..................... 246/122 R |
| 5,862,195 A | 1/1999 | Peterson, II | |
| 5,903,856 A | 5/1999 | Rompe | |

(Continued)

FOREIGN PATENT DOCUMENTS

JP   06183348 A  *  7/1994

OTHER PUBLICATIONS

Goode, David R., "Pruning and improving equipment fleet", Railway Age, Jun. 1996, vol. 197, No. 6, p. 47.*
Anonymous, "The proof is in the payout", Railway Age, Aug. 1991, vol. 192, No. 8, p. 50-52.*

*Primary Examiner*—Joseph Thomas
*Assistant Examiner*—Rachel L. Porter
(74) *Attorney, Agent, or Firm*—Carlos Hanze; Armstrong Teasdale LLP

(57) ABSTRACT

A system for determining the sources of delay of a transportation mean includes a wayside sub-system, a locomotive sub-system, a railcar sub-system, a yard sub-system, a schedule sub-system, a monitoring and diagnostic sub-system and a management sub-system. Real-time collected data from the sub-systems are compared to a standard data set to identify problem areas without human intervention. Utilizing a list of top problem areas, transportation means managers are able to identify corrective actions to eliminate or minimize the sources of problem areas. In addition, customers or users of specific transportation means are able to properly select the appropriate transportation means.

28 Claims, 2 Drawing Sheets

U.S. PATENT DOCUMENTS

| | | | |
|---|---|---|---|
| 5,904,727 A | * | 5/1999 | Prabhakaran ............... 701/208 |
| 5,906,263 A | | 5/1999 | Schneider et al. |
| 5,907,286 A | | 5/1999 | Kuma |
| 5,983,144 A | * | 11/1999 | Bonissone et al. ............ 701/19 |
| 6,115,696 A | | 9/2000 | Auger |
| 6,144,901 A | * | 11/2000 | Nickles et al. ................ 701/19 |
| 6,170,630 B1 | | 1/2001 | Goss et al. |
| 6,216,071 B1 | | 4/2001 | Motz |
| 6,227,375 B1 | | 5/2001 | Powollik et al. |
| 6,332,106 B1 | * | 12/2001 | Hawthorne et al. ........... 701/19 |

* cited by examiner

TOTAL TRANSPORTATION MANAGEMENT SYSTEM

CROSS REFERENCE TO RELATED APPLICATIONS

This application claims the benefit of U.S. Provisional application No. 60/153,178, filed Sep. 10, 1999.

BACKGROUND OF THE INVENTION

This invention relates generally to methods and apparatus for managing a transportation system, and more specifically to methods and apparatus for generating and exchanging data to manage the transportation system.

Many means of transportation exist today to deliver goods from a point of origination to a destination point. Such transportation means of vehicles include barges, trucks, planes and railroads. A shipper may use one or more transportation means to deliver a product from a factory to the actual customer. In order to answer questions from the customer as to a status of the delivery, owners of these transportation means have developed methods for estimating the location of the means used to deliver the goods. Using this system, a company may use this information to estimate a time of delivery.

Unfortunately, as a result of many unknown factors, the accuracy of the estimate may vary widely and the transportation means owners are usable to learn from the data. It would therefore be desirable to provide a method and apparatus that generates and collects data from a plurality of sensors or devices to effectively manage the transportation system. In addition, by properly analyzing the data, trouble sources are identified. By eliminating or reducing these trouble sources or impact, the efficiency of the transportation system is improved.

BRIEF SUMMARY OF THE INVENTION

There is therefore provided, in one embodiment, methods and apparatus for managing and controlling the operation of a transportation system. The system utilizes data collected from a plurality of sub-systems to determine sources of delay as well as actions to be taken to improve the transportation means. More specifically, the system includes at least one of a wayside sub-system, a locomotive sub-system, a railcar sub-system, a yard sub-system, a monitoring schedule sub-system, a monitoring and diagnostic sub-system and a management sub-system. The data collected from the sub-systems are compared to a standard data set to generate at least one problem area. The problem area includes the quantity of delay caused by the problem as well as frequency of occurrence.

Utilizing the problem area information, transportation means managers take appropriate actions to eliminate the problems. For example, if a particular asset is at the top of a course of delay problem list, the manager takes appropriate action to repair or replace the asset. Particularly, if a railcar has brakes which are always overheating so that the train must be slowed down, the railcar brakes are repaired or replaced.

DETAILED DESCRIPTION OF THE INVENTION

Figure 1:
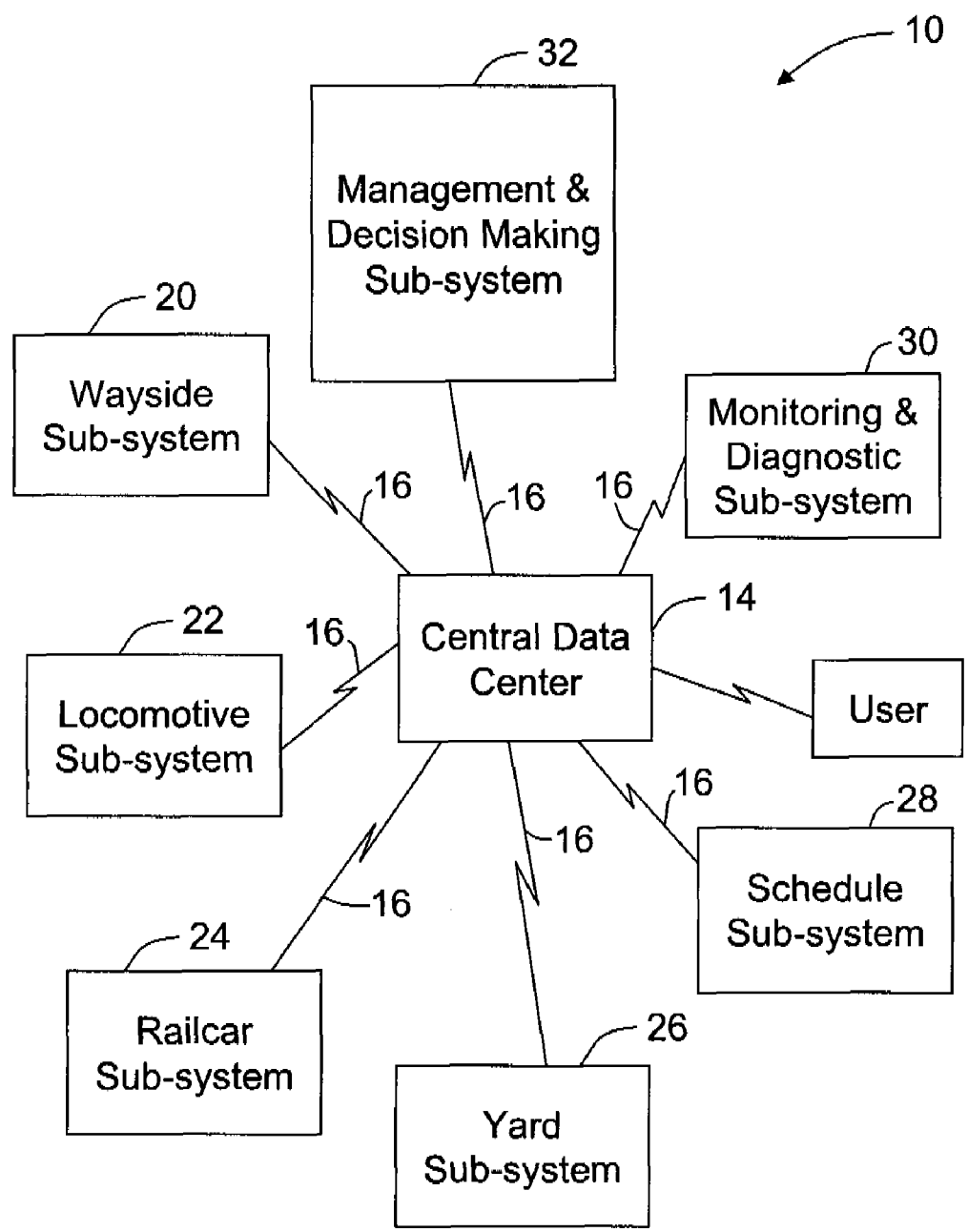
FIG. 1 is a schematic of a transportation management system in accordance with one embodiment of the present invention.

In on embodiment and referring to FIG. 1, transportation management system 10 includes a plurality of sub-systems 12 for generating, collecting, exchanging and utilizing data. More specifically, data generated by each sub-system 12 is exchanged with at least a central distribution center 14. In one embodiment, central distribution center 14 is a computer (not shown) or plurality of computers (not shown) configured to exchange data. At least one user is coupled to center 14 and/or sub-system 12 using known methods, e.g., a display and a keyboard. In addition, each sub-system 12 is capable of exchanging data with any number of other sub-systems 12 and/or central distribution center 14 using at least one communication link 16. Known communication links 16 include at least one transmitter and receivers (not shown) for exchanging data utilizing wires, radio frequency (RF), cellular, satellite, fiber optic and computer networks. As a result, data generated by any sub-system 12 may be transmitted to at least one center 14 and any other sub-system 12. Center 14 is also capable of individually or simultaneously transmitting data to sub-systems 12 using links 16.

More specifically and in one embodiment configured for a railroad transportation system, sub-system 12 includes at least a wayside sub-system 20, a locomotive sub-system 22, a railcar sub-system 24, a yard sub-system 26, a schedule sub-system 28, a monitoring and diagnostic sub-system 30 and a management or decision making sub-system 32. In one embodiment, wayside sub-system 20 generates a data set including one of a track or rail status, an environment status for at least one pre-defined geographic or track area, and track data containing measured or otherwise known track topology including position, slope and curvatures. Utilizing known track status circuits, the track status is determined. For example utilizing a current monitoring circuit, upon detecting a broken rail, one data point of the data set is altered or changed from a first state to a second state, e.g., from a low state to a high state, to indicate a broken rail track status. The environmental status, in one embodiment, includes at least basic weather data including temperature, humidity and precipitation. Track topology is stored in a track database as known to those skilled in the art.

Locomotive sub-system 22, in one embodiment, includes sensors (not shown) for generating a data set representative of at least one of a location and operational and/or performance characteristics of each locomotive in a train (not shown). The generated data set is transmitted to at least center 14 utilizing link 16. Sub-system 22 also includes controls (not shown) for modifying characteristics of each locomotive (not shown) based upon commands transmitted from other sub-systems 12 and center 14. For example, the controllable or alterable characteristics include at least a speed of each locomotive and application of brakes to the locomotive and/or railcars (not shown) coupled to the locomotives. In addition, data transmitted to sub-system 22 may also include directions or information for use by the locomotive operator. In one embodiment, the sensors include fuel level monitors, engine characteristics including temperature, oil pressure, and other similar devices utilizing circuits known to those skilled in the art.

Figure 2:
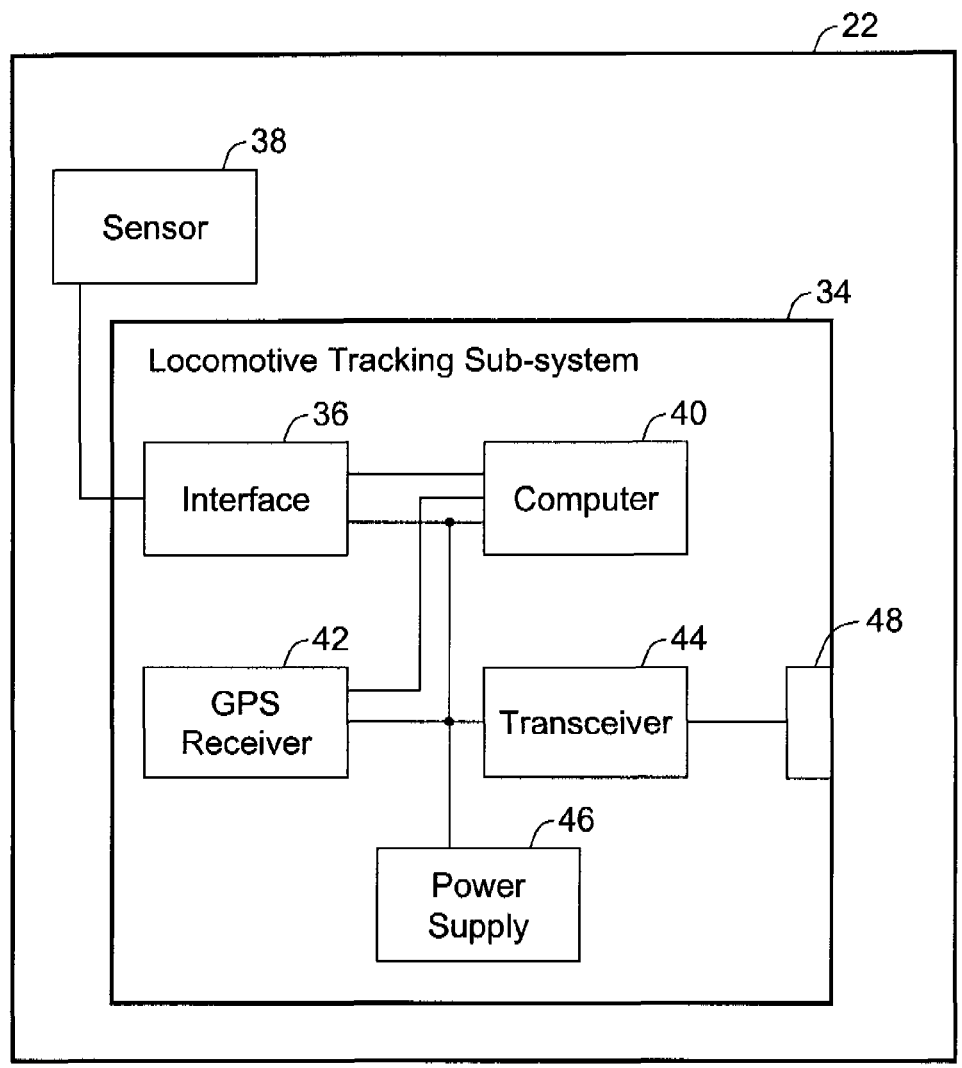
FIG. 2 is block diagram of a locomotive sub-system.

FIG. 2 is a block diagram of locomotive sub-system 22 including an on-board location tracking system 34. Although on-board tracking system 34 is sometimes described herein in the context of a locomotive, it should be understood that tracking system 34 can be used in connection with railcar sub-system 24 as well as any other train consist member. More specifically, tracking system 34 of the present invention may be utilized with locomotives, rail cars, any maintenance of way (vehicle), as well as other types of transportation vehicles, e.g., trucks, trailers, baggage cars. Also, and as explained below, each locomotive sub-system 22 and railcar sub-system 24 of a particular train may not necessary have on-board tracking system 34.

As shown in FIG. 2, tracking sub-system 34 includes locomotive interfaces 36 for interfacing with other systems of the particular locomotive on which on-board system 34 is mounted, and a computer 40 coupled to receive inputs from interface 36. System 34 also includes a GPS receiver 42 and a transceiver 44. In one embodiment, receiver 42 includes a least one Global Positioning Satellite (GPS) receiver (not shown) for determining a real-time absolute or relative geographic position or location of each locomotive. Position is represented as a geodetic position, i.e., latitude and longitude. The absolute position and sensor data is provided in real-time to other sub-systems 12. Transceiver 44 includes a satellite communicator or radio frequency (RF) transceiver, coupled to computer 40 for exchanging, transmitting and receiving data messages with central system 14 or sub-systems 12. Of course, tracking sub-system 34 also includes a power supply 46 for supplying power to components of sub-system 34. A radome (not shown) is mounted on the roof of the locomotive and houses transmit/receive antennas (not shown) coupled to satellite communicator 44 and an active GPS antenna 50 coupled to GPS receiver 42 for receiving GPS positioning data from GPS satellites 52.

Generally, each onboard tracking sub-system 34 determines an absolute position of the vehicle, e.g., locomotive, on which it is mounted and additionally, obtains information or data regarding specific locomotive sensors that relate to the operational state of the locomotive. Each equipped locomotive operating in the field determines its absolute position and obtains other information independently of other equipped locomotives. Additionally, in one embodiment, locomotive sub-system 22 includes a second sensor, e.g., a gyro, for determining heating or direction of the locomotive or railcar.

In one embodiment, each railcar or selected group of railcars in a train includes a railcar sub-system 24. Each railcar sub-system 24 includes at least one sensor for generating a data having at least one of a real-time location or position, railcar identification and/or cargo status or information including environmental data concerning the cargo including the temperature, vibration, shock, critical functions of the cargo, e.g., refrigeration unit status, or time until spoilage. As described above, railcar sub-system 24 includes a tracking sub-system 34 for determining real-time position or location of the railcar. For example, each railcar within a train includes one or more sensors for collecting data relevant to that specific railcar. For a railcar having a refrigeration unit and loaded with frozen steaks, railcar sub-system 24 includes a sensor for measuring the temperature inside the railcar, a sensor for measuring the humidity and a sensor for measuring the amount of fuel remaining or used by the refrigeration unit. For a railcar hauling livestock, railcar sub-system 24 includes sensors, e.g., at least one accelerometer, for measuring shock and vibration (longitudinal, horizontal and vertical) and air temperature and humidity. If the data generated by the sensors exceed certain pre-defined or user defined limits, certain actions would be taken.

For example, if a train is parked, prior to the combination of air temperature and humidity exceeding a certain level or heat index, a cooling system is engaged or the train is moved to circulate the air so that the livestock do not perish due to the extreme heat. Similarly, if the temperature falls below a set level, a heating system on the railcar is engaged. Other railcar sub-systems 24 include wheel and wheel bearing temperature measurement sensors such as those sensors known to those skilled in the art. If the temperature of a wheel or bearing exceed a defined level, sub-system 24 transmits the sensor data to another sub-system 12 or center 14. Appropriate action is then taken based upon the data, e.g., if temperature exceeds a first defined limit, the railcar is scheduled for removal and maintenance at a next maintenance facility or the temperature exceeds a second higher temperature, the train is stopped.

Sensor data generated by railcar sub-system 24 is transmitted in real-time to another sub-system 12 or centers 14 or is collected until the data set meets a defined size or has been collected over a defined period of time. For example, in one embodiment, a data set generated by each sub-system 24 is transmitted to center 14 via locomotive sub-system 22 utilizing links 16. Each data set, in another embodiment, is transmitted to wayside unit 22 as each railcar passes a predetermined location. For example, each data set may be transmitted to at least one wayside unit 22 as the locomotive passes within a pre-defined geographic area or distance from a wayside unit 22.

Yard sub-system 26 generates a data set representing the capacity for assembling trains, the time required to travel through the yard, and the time to assemble a selected train. In one embodiment, yard sub-system 26 includes a computer system (not shown) and a set of commands and algorithms stored in the computer system for generating and analyzing the data set. The data set is collected by determining the location of the trains within the yard, the number of tracks, and the number of people or crews available to assemble the trains. This data is then transmitted to other sub-systems 12 and center 14. In addition, commands including for example build instructions or prioritization of selected train are transmitted to yard sub-system 26. System 10 includes a yard sub-system 26 for each yard (not shown) to be controlled and monitored.

In one embodiment, schedule sub-system 28 collects data from other sub-systems to determine at least one optimal plan or schedule for all trains under the control of system 10. Schedule sub-system 28 collects and utilizes data representing the number of tracks, a number and geographic location of turn-outs, a safe distance between trains on the same track and track environment to transmit speed and location commands to the trains. More specifically, the commands are transmitted or sent from sub-system 28, directly, or via center 14, to locomotive sub-system 22.

Monitoring and diagnostic sub-system 30 creates or generates data that includes at least one of data representative of times required to complete scheduled maintenance and unscheduled repairs, failure rates of at least some of parts or components, a quantity of each part in stock and a location of the part, a typical delivery time for non-in-stock parts, and a cost for at least some parts. In addition, the data may include an analysis of failures and historical data leading to the failure. For example, data is constantly collected at center 14 for each locomotive. Upon the occurrence of a failure, the historic data of the train is analyzed to attempt to determine a correlation between the failure and the recent activity of the train, e.g., locomotive and/or railcar. In one embodiment, sub-system 30 also analyzes data generated and collected by other sub-systems 12 to identify or anticipate failures. For example, utilizing data transmitted by locomotive system 22 indicating a high temperature and a near term scheduled maintenance activity, sub-system 30 determines that a probability of a certain type of failure is increased and notifies center 14. Corrective action is then taken utilizing this data, e.g., show the train to a pre-defined slow speed. Analysis of the data is also utilized by sub-system 30 to determine predictive and preventative analysis and fuel consumption.

Management or decision making sub-system 32 exchanges data with other sub-systems 12 and center 14 to generate data representative of at least one of a prediction of when each train should arrive at its destination, what the best route or most efficient route, how many, where and when crews are needed. Using the failure analysis, sub-system 32 determines where to place emergency equipment, where to build repair shops, and the in-stock components or parts for each repair shop. For example, for a selected geographic location near a steep grade, a certain identified component may have a failure rate significantly higher than other geographic locations. As a result, a repair of shop near this geographic location would inventory more of these types of parts, therefore reducing down time associated with an unscheduled repair. Sub-system 32 also utilizes the collected data to determine how to assemble the trains in the yards and how many crews are needed to complete the work, as well as the opportunity to separate, or decouple a portion of a train and reschedule or redirect the destination of this portion due to a change in the priorities or destination of this portion. For example, if a certain geographic location is slowed due to inclement weather, certain low priority shipments can be separated and replaced with higher priority shipments. These cars can be specifically identified using the data from railcar system 24.

In operation, management sub-system 32 utilizes the data set collected from at least one of sub-system 20, 22, 24, 26, 28 and 30 and management algorithms for determining problem areas of the railroad. The management algorithms include at least one of top problem areas, congestion areas to determine whether to build more track, asset utilization, impacts of late deliveries including lost revenue, and statistical information product performance. More specifically, utilizing a determined standard time for a train to travel from point A to point B as stored in sub-system 28, management sub-system 32 automatically determines when a travel time for train T1 exceeds this standard time or predicts that train A will exceed the standard travel time. This determination is then transmitted to an operator or user responsible train A.

In addition, in one embodiment, this determination is also transmitted to a responsible manager for all trains traveling between points A and B as well as any user having goods on train A. Upon receiving the notice excessive time, the manager reviews the data set generated from sub-system 12 impacting train A. In one embodiment, management sub-system 32 provides a detailed analysis of the delays for train A. For example, utilizing commands and software tools known in the art, the collected data set is compared to a standard data set to generate a non-standard or error data set. This error data or problem data is captured or stored in system 10, e.g. in a file in data center 14, and displayed to the manager. This non-standard data includes weather and track issues generated from wayside sub-system 20, locomotive data generated by locomotive sub-system 22, railcar issues generated by railcar sub-system 24, yard issues from yard sub-system 26, system delay data from schedule sub-system 28 and operational issue data from remote diagnostic sub-system 30.

For example, if the track between point A and point B was covered with ice or a broken rail caused train A to be parked for 8 hours while the track was repaired, management sub-system 32 displays this non-standard data from wayside sub-system 20. Similarly, if the source of the delay is a result of train A waiting for another train, e.g., train B, schedule sub-system 28 would generate non-standard data representative of the delay. All non-standard data is reveiwable by a user having proper access.

The non-standard data is reviewable at a high level to determine the total delay caused as well as individual components of the delay. Specifically, management sub-system 32 automatically displays non-standard data for an entire system or for a user defined or selected geographic area or location. For example, a manager having access is able to examine all delays caused by a selected type of issue or failure. For example, examining the data set generated by all wayside sub-systems 20, the manager is able to determine how many tracks are broken. This manager utilizes this data by altering the path for trains originally scheduled to use those tracks as well as prioritize the dispatching of the repair crews to fix the tracks having the largest impact. Similarly, each sub-system 12 provides specific non-standard data including locomotive delays, railcars delays, maintenance delays and scheduled delays.

Utilizing the data collected from individual sub-systems 12, system 10 provides information to each sub-system 12 so that automatically the total delays are minimized. Specifically, utilizing management sub-system algorithms, system 10 alters the performance of the assets controlled by system 10. For example, after making a determination that a train speed may be increased while remaining within a set of limits or rule and not increasing the total delays for system 10, schedule sub-system 28 transmits data to locomotive sub-system 22 to increase the speed of the train to reduce the amount of delay for that given train. As a result of the real-time data including real-time position data, system 10 continuously updates overall system performance and delay information.

In addition to continuously monitoring and controlling the operation of the assets within system 10, system 10 is utilized by customers or users of the assets controlled by system 10. For example, a shipper utilizes real-time data to determine an optimal or most efficient transportation means and/or route for a shipment. For example, determine the relative cost, schedule and risk associated with different types of transportation means as well as different companies within a selected means. Specifically, the shipper compares the current cost, travel time and projected accuracy of delivery time of several transportation means each utilizing a separate or collective system 10. By hosting system 10 on the Internet or allowing access through known methods over a distributed network, companies can auction shipping capacity or auction the right to carry the cargo. This also includes the ability to revise the cost associated with a delay or improvement in the scheduled delivery time and real-time coordination with shippers. For example, if a train is scheduled to arrive late, allow shipper to decide to allow delay or pay more to get there sooner.

This data is useful to:

Finance Company

Determinate at least one of a predictive life of railcar and maintenance cost.

Insurance Company

System 10 data is analyzed to determine at least one of a claim type and quantity, risk profile of carrier, railcar and/or routes. More specifically, utilizing data collected from sensors of sub-systems 12 sources of damage claims are determined. Particularly, where the shipments are damaged by shock, vibration and/or temperature, the source of damage is determined by analyzing the data generated by railcar sub-system 24. More particularly, by analyzing the data, at least one specific location and or time of above acceptable values of shock, vibration, and/or temperature is determined. Utilizing this analysis, specific locations are identified for repair to reduce the shock and vibration. For example, a particular section of track may have crown chips so that a railcar traveling at a certain speed incur above acceptable shock which causes damage to the shipment. The collected data is utilized to assign at least a portion of the damage to the owner of the identified track or increases the insurance cost for transportation means utilizing this section of track.

Suppliers

System 10 assists manufacturers with inventory control and proper ordering to satisfy just in time scheduling. Specifically, utilizing data generated from system 10, a delivery time for a transportation means is determined for each of a plurality of transportation means. Based upon the delivery time, the appropriate transportation means is selected. In addition, after the shipment is enroute via the selected transportation means, system 10 is utilized to provide a real-time location of the shipment.

Transportation means providers

System 10 provides important real-time data for railroad executive management. Specifically, every aspect of the transportation means is analyzed by system 10. More specifically, each aspect of the transportation means is analyzed by as to the magnitude. Utilizing this delay data, appropriate decisions are made by the managers of the transportation means. For example, if a particular section of track is the source of most delays because of limit in capacity, a decision to add more capacity by adding a second track in this section. As a result, the identified source of delay is eliminated to reduced and a new list of highest delay sources is generated by system 10. The data may also demonstrate the need for less crews, more crews, different placement, the need for more vehicles or different placement of the vehicles.

Of course data collected or generated by other data collection systems or management information systems (MIS) (not shown) are easily combined with data generated or collected by center 14 and sub-systems 12. Specifically, to determine the limits or defined values for temperatures limits of a railcar are determined by center 14 or sub-systems 12 utilizing data transmitted or obtained from a railroad database including bill of lading information. This bill of lading data may also include a container number, a railcar identification number, and container content data generated.

Although the invention has been described and illustrated in detail, it is to be clearly understood that the same is intended by way of illustration and example only and is not to be taken by way of limitation. Additionally, system 10 described above is applicable to control and monitor airplanes at an airport or on the ground, barges on a river, trucks in a truck yard, or any other transportation vehicle.

While the invention has been described in terms of various specific embodiments, those skilled in the art will recognize that the invention can be practiced with modification within the spirit and scope of the claims.

What is claimed is:

1. A computer-implemented method for automated management of a plurality of railroad transportation system and business entity assets by a transportation business entity, the plurality of railroad transportation system and business entity assets comprising a train including at least one locomotive and at least one of piece of rolling stock, at least one railroad support vehicle, at least one piece of railroad support equipment, and at least one business entity facility, said method comprising the steps of:

collecting a first set of transportation data from at least one sub-system associated with a railroad transportation system, asset and collecting a second set of transportation data from at least one subsystem associated with a business entity asset;

transmitting the first and second sets of transportation data to a central data center via a communication link;

comparing the first and second sets of collected transportation data set to a standard transportation data set;

generating at least one problem area data set based upon the comparison of the collected and standard data, the problem area data set including a transportation business entity schedule impact, and a transportation business entity asset requirement;

prioritizing each generated problem area data set relative to each other generated problem area data set;

recommending business activities relating to managing the plurality of railroad transportation system assets and business entity assets of the transportation business entity based on the priority of the problem area data sets such that a total transportation business entity delay time is minimized wherein recommending business activities relating to managing the transportation business entity includes at least one of altering an asset allocation priority, generating a maintenance action based on an actual or an anticipated failure due to recent transportation system activity, and altering a state of a transportation system environmental system to protect a cargo, and wherein based on a component failure analysis, recommending business activities relating to managing the transportation business entity also includes at least one of determining a location of emergency equipment, recommending a location for a repair facility, determining an emergency equipment inventory, and determining an inventory for each repair facility; and transmitting the recommendations to the plurality of railroad transportation system assets from a central data center to facilitate implementing the recommendations.

2. A method in accordance with claim 1 wherein collecting the first set and the second set of transportation data from a plurality of sub-systems comprises collecting at least one set of transportation data from a plurality of sub-systems wherein the plurality of subsystems includes at least one of a wayside sub-system, a locomotive sub-system, a railcar sub-system, a yard sub-system, a schedule sub-system, a monitoring and diagnostic sub-system and a management making sub-system.

3. A method in accordance with claim 1 wherein collecting the first set and the second set of transportation data from a plurality of sub-systems comprises the step of collecting real-time data from at least one sub-system.

4. A method in accordance with claim 3 wherein the transportation system includes at least one vehicle, and said method further comprising the step of altering a performance of the vehicle based upon the problem area data set.

5. A method in accordance with claim 4 wherein said step of altering the performance of the vehicle based upon the problem area data set comprises the step of continuously altering the performance of the vehicle based upon the real-time data.

6. A method in accordance with claim 1 further comprising the step of identifying at least one source of delay.

7. A method in accordance with claim 6 wherein said step of identifying at least one source of delay comprises the step of identifying a defined quantity of largest source of delays.

8. A method in accordance with claim 7 wherein said step of identifying a defined quantity of largest source of delays comprises the step of selecting a number of largest source of delays based on a user input.

9. A method in accordance with claim 1 further comprising the steps of determining a predicted transportation system delay based upon the problem area data.

10. A method in accordance with claim 1 wherein generating at least one problem area data set based upon the comparison of the collected and standard data comprises identifying delays for each of at least one of a selected type of delay or failure.

11. A method in accordance with claim 10 wherein said selected type of delay comprises at least one of maintenance delays and broken track delays.

12. A method in accordance with claim 10 wherein recommending business activities comprises sorting the identified delays based upon a magnitude of the delay.

13. A method in accordance with claim 1 wherein recommending business activities relating to managing the transportation business entity comprises at least one of predicting a life a railcar and predicting a maintenance cost of the railcar over the life of the railcar.

14. A method in accordance with claim 1 wherein generating at least one problem area data set based upon the comparison of the collected and standard data comprises determining shipment damage locations.

15. A method in accordance with claim 1 wherein recommending business activities relating to managing the transportation business entity comprises determining at least one of an insurance claim type, a quantity of insurance claims, and a risk profile of at least one of a transportation carrier, railcar car, and a route.

16. A method in accordance with claim 1 wherein recommending business activities relating to managing the transportation business entity comprises providing real-time transportation entity management with real-time transportation system-wide problem area data sets.

17. An automated management system for managing a plurality of transportation system assets by a transportation business entity, said system comprising:
at least one sub-system for collecting at least one set of transportation data from respective ones of said plurality of transportation system assets;
a sub-system for analyzing the at least one set of collected transportation data set for at least one of failure modes and effects, anticipated failure probabilities, and failure corrective actions;
a sub-system for comparing the at least one set of collected transportation data set to at least one standard transportation data;
a sub-system for generating at least one problem area data set based upon the comparison of the collected and standard data, the problem area data set including a transportation business entity schedule impact, and a transportation business entity asset requirement; and
a management and decision making sub-system that is configured to:
recommend business activities relating to managing the transportation business entity based on at least one of the generated problem area data set and the comparison of the collected and standard data wherein the business activities relating to managing the transportation business entity are based on the priority of the problem area data sets such that a total transportation business entity delay time is being minimized, and wherein the business activities relating to managing the transportation business entity includes at least one of altering an asset allocation priority, generating a maintenance action based on an actual or an anticipated failure due to recent transportation system activity, altering a state of a transportation system environment system to protect a cargo, and wherein based on a component failure analysis, the business activities relating to managing the transportation business entity also includes determining a location of emergency equipment, recommending a location for a repair facility, determining an emergency equipment inventory, and determining an inventory for each repair facility, and
transmit the recommendations to the plurality of railroad transportation system assets from a central data center to facilitate implementing the recommendations.

18. A management system in accordance with claim 17 wherein said at least one sub-system includes at least one of a wayside sub-system, a locomotive sub-system, a railcar sub-system, a yard sub-system, a schedule sub-system, a monitoring and diagnostic sub-system and a management or decision making sub-system.

19. A management system in accordance with claim 17 wherein said at least one sub-system for collecting at least one set of transportation data is configured to collect real-time data from said at least one sub-system.

20. A management system in accordance with claim 19 wherein the transportation system includes at least one vehicle, said management system configured to alter a performance of at least one vehicle based upon the problem area data set.

21. A management system in accordance with claim 20 wherein at least one sub-system is configured of continuously altering the performance of the vehicle based upon and real-time data.

22. A management system in accordance with claim 17 wherein said at least one sub-system is configured to identify at least one source of delay.

23. A management system in accordance with claim 22 wherein said at least one sub-system is further configured to identify a pre-defined quantity of largest source of delays.

24. A system in accordance with claim 17 comprising a management and decision making sub-system configured to provide transportation entity management with real-time transportation system-wide problem area data sets.

25. A management system in accordance with claim 17 wherein said management and decision making sub-system is further configured to alter the status of a non-locomotive component in response to the generated problem area data set, wherein said non-locomotive component includes at least one of a repair vehicle, a maintenance work order, and a track capacity.

26. A computer-implemented system comprising a plurality of railroad transportation system and business entity asset sub-systems and a transportation business entity central data center, said computer configured to:
collect at least one set of transportation data from a plurality of subsystems associated with said plurality of railroad transportation system and business entity assets;

automatically modify a performance of controlled assets such that total transportation system delays are minimized;

compare said collected transportation data set to at least one standard transportation data;

generate at least one problem area data set based upon the comparison of the collected and standard data;

prioritize top transportation system problem areas wherein said priority is based upon a total transportation business entity delay time being minimized;

recommended business activities relating to managing the transportation business entity based on the prioritized transportation system problem areas wherein recommending business activities relating to managing the transportation business entity includes at least one of altering an asset allocation priority, generating a maintenance action, altering a state of a transportation system environmental system, and based on a component failure analysis, the business activities relating to managing the business entity also includes determining at least one location to place emergency equipment, recommending at least one repair facility location, determining an emergency equipment component inventory, and determining a repair facility component inventory; and outputting the recommendations to the plurality of railroad transportation system assets from a central data center to facilitate implementing the recommendations.

27. A system in accordance with claim 26 further configured to determine a predicted delay based upon said problem area data.

28. A system in accordance with claim 27 wherein said predicted delay is generated from at least one of a transportation system component failure rate, a time required to complete a component maintenance action, and anticipated failure delay.

* * * * *